United States Patent
Pavlick et al.

(10) Patent No.: US 6,264,083 B1
(45) Date of Patent: Jul. 24, 2001

(54) ADD-ON TOOL BOX TRANSPORT FOR USE WITH A TRUCK BED

(76) Inventors: Kenny R. Pavlick; Rosie L. Pavlick, both of 8790 700th St., Williamsport, IN (US) 47993

( * ) Notice: Subject to any disclaimer, the term of this patent is extended or adjusted under 35 U.S.C. 154(b) by 0 days.

(21) Appl. No.: 09/526,684

(22) Filed: Mar. 16, 2000

(51) Int. Cl.$^7$ ..................................................... B60R 9/00
(52) U.S. Cl. ........................... 224/404; 224/281; 296/37.6
(58) Field of Search ................................. 224/401, 405, 224/281; 296/37.6

(56) References Cited

U.S. PATENT DOCUMENTS

| | | | |
|---|---|---|---|
| 4,522,326 | * | 6/1985 | Tuohy, III ........................ 224/404 X |
| 4,635,992 | * | 1/1987 | Hamilton et al. ................. 224/404 X |
| 4,752,095 | * | 6/1988 | Brady ............................... 224/404 X |
| 5,037,153 | * | 8/1991 | Stark ................................. 224/281 X |
| 5,121,959 | * | 6/1992 | King ................................. 224/404 X |
| 5,924,616 | * | 7/1999 | Shives .................................. 224/404 |

* cited by examiner

Primary Examiner—Gregory Vidovich
(74) Attorney, Agent, or Firm—John D. Gugliotta

(57) ABSTRACT

An add-on tool box transport kit for use with a truck bed is disclosed, consisting of a set of four brackets which are releasably secured to a traditional tool box. Each bracket has a roller on one end and a wheel on the other. The wheel acts as a wheel for the tool box while the roller rests in a track located on the inside wall of the truck. The bracket is adjustable horizontally and vertically.

3 Claims, 4 Drawing Sheets

ADD-ON TOOL BOX TRANSPORT FOR USE WITH A TRUCK BED

RELATED APPLICATIONS AND DISCLOSURES

The present invention was first disclosed in the Disclosure Document filed on Mar. 22, 1999. There have been no previously filed, nor any copending applications, anywhere in the world.

BACKGROUND OF THE INVENTION

1. Field of the Invention

The present invention relates generally to truck accessories, and, more particularly, to an add-on tool box transport kit for use with a truck bed.

2. Description of the Related Art

Many truck owners keep a tool box in their truck beds. These tool boxes are traditionally mounted in a stationary position at the anterior end of the truck bed. This configuration, however, causes several problems. First, the tool box is not mobile, as it is large. Second, a person cannot remove the tool box from the truck and easily transport it to a site. Third, the tool box can only be accessed by reaching over the side of the truck or climbing into the truck bed. This is cumbersome and time consuming.

In the related art, at least one device discloses a roll-out deck apparatus fitted for a pick-up truck. These include U.S. Pat. No. 5,829,945, issued in the name of Stanley.

Several patents describe a rolling tool box slidably mounted and supported between channels installed on opposite side walls of a pick-up truck bed. These include U.S. Pat. No. 4,889,377, issued in the name of Hughes, U.S. Pat. No. 4,522,326, issued in the name of Tuohy, III, and U.S. Pat. No. 4,305,695, issued in the name of Zachrich.

Several patents disclose a vehicular storage device comprising a storage panel selectively movable. These include U.S. Pat. No. 5,076,630, issued in the name of Henriquez, U.S. Pat. No. 5,015,025, issued in the name of Henriquez, and U.S. Pat. No. 4,705,315, issued in the name of Cherry.

Of particular interest is U.S. Pat. No. 5,088,636, issued in the name of Barajas. The Barajas device discloses a traditional truck bed tool box that has rollers on both ends. The rollers allow the box to roll along channels attached to the interior side walls of the truck bed. However, the Barajas device is not designed to be removed from the truck bed, as the rollers are stuck in the channels they ride in. The Barajas device is a new type of tool box, not a kit that can be adapted for use with existing tool boxes. Also, the Barajas device does not deal with moving the tool box once off of the truck bed.

What is needed, therefore, is a device that can be used with existing tool boxes, thus allowing a traditional, standard tool box to be conveniently rolled inside of a truck bed while also allowing the traditional tool box to be quickly removed from the truck bed and easily moved about the ground while being used as a traditional tool box.

A search of the prior art did not disclose any patents that anticipate directly many features of the instant invention. Consequently, a need has been felt for providing an apparatus and method which overcomes the problems cited above.

SUMMARY OF THE INVENTION

It is therefore an object of the present invention to provide an improved add-on tool box transport kit for use with a truck bed that can be used with existing tool boxes, thus allowing a traditional, standard tool box to be conveniently rolled inside of a truck bed while also allowing the traditional tool box to be quickly removed from the truck bed and easily moved about the ground while being used as a traditional tool box.

Briefly described according to one embodiment of the present invention, a add-on tool box transport kit for use with a truck bed is disclosed, comprising a set of four brackets which are releasably secured to a traditional tool box. Each bracket has a roller on one end and a wheel on the other. The wheel acts as a wheel for the tool box while the roller rests in a track located on the inside wall of the truck. The bracket is adjustable horizontally and vertically.

Other objects of the present invention include providing a device that is easily attached to a truck bed and to a tool box and providing a device that is easy to use.

DESCRIPTIVE KEY 10 an add-on tool box transport kit for use with a truck bed
20 tool box
30 truck
40 bed
50 roller assembly
60 bracket
70 bracket securement means
80 hole
90 bolt
100 roller
110 track
120 rail
130 roller locking means
140 wheel

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the FIGS. 1 through 7.

1. Detailed Description of the Figures

Figure 1:
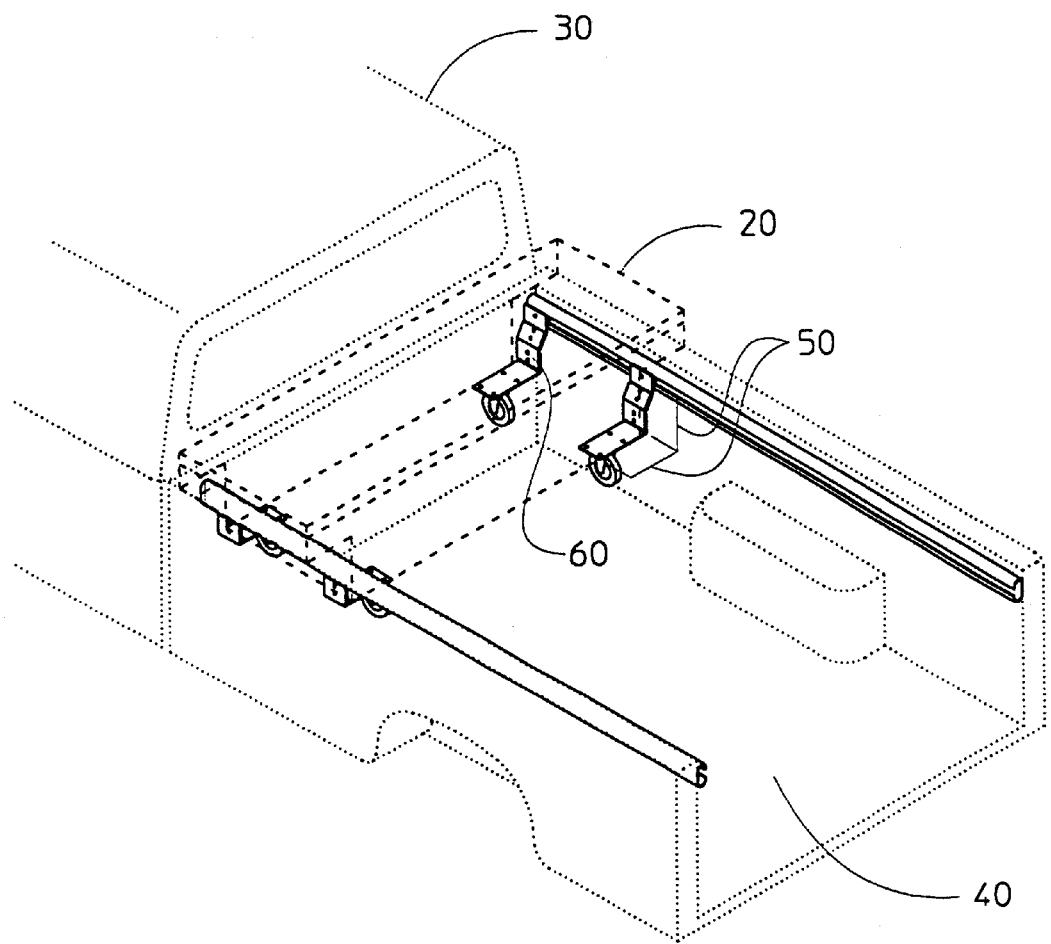
FIG. 1 is a perspective view of the preferred embodiment of an add-on tool box transport kit for use with a truck bed 10.

Referring now to FIG. 1, an add-on tool box transport kit for use with a truck bed 10 is shown, according to the present invention, designed as a roller track for tool boxes 20 especially designed for pick-up trucks. The present invention is designed to allow access to a tool box 20 without having to climb into the truck 30 bed 40.

Referring now to FIGS. 1 through 4, the present invention is comprised of four roller assemblies 50 which are designed to be releasably secured to a conventional tool box 20. Each roller assembly is comprised of a generally L-shaped bracket 60 which is releasably secured to the bottom and side surface of the tool box 20 and which extends outward and upward from the end of the tool box 20. The bracket may be an add on kit used with conventional tool boxes 20 or incorporated into the design of a tool box 20.

Figure 2:
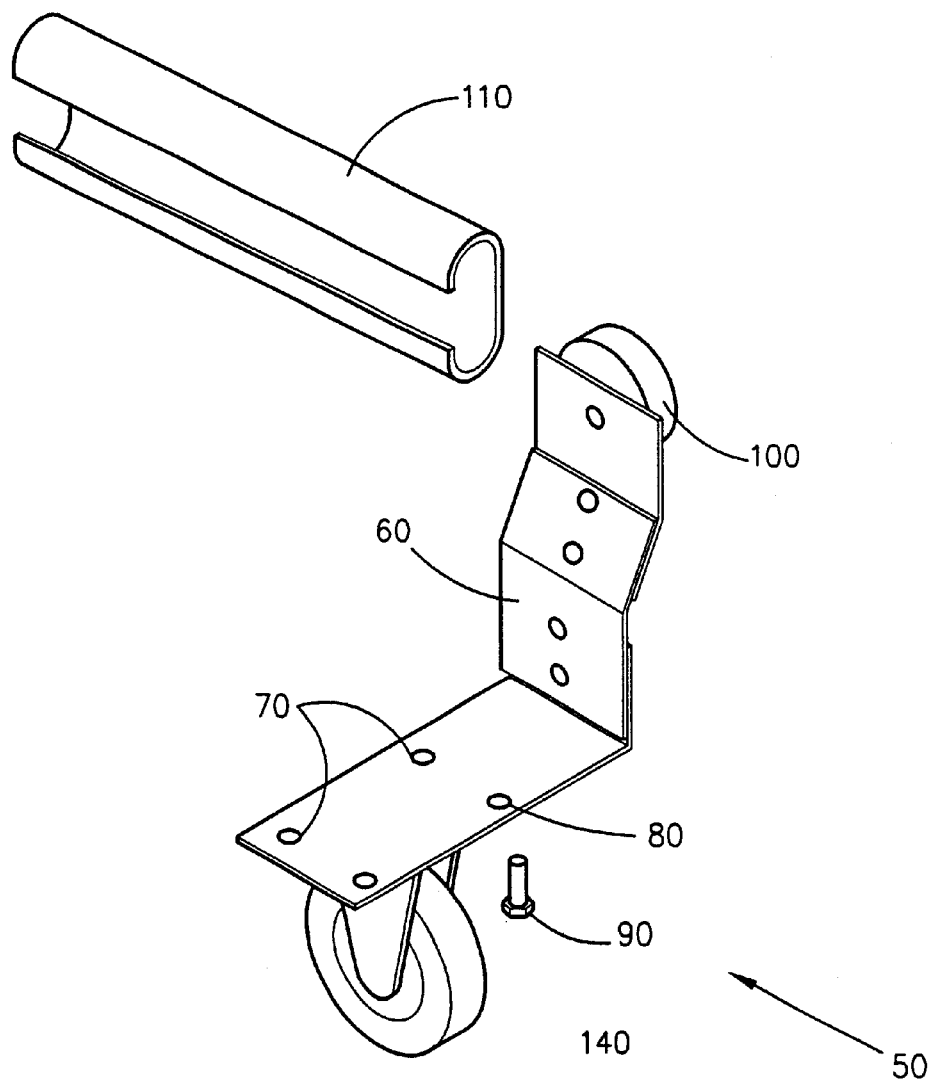
FIG. 2 is a perspective view of the roller assembly.
Figure 3:
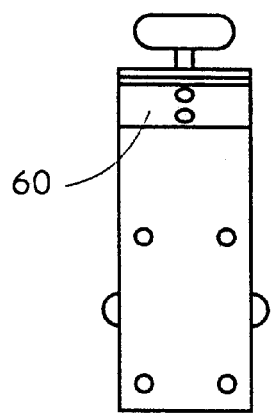
FIG. 3 is a top view of a bracket.

Referring now to FIGS. 1 and 2, releasably securement is achieved via bracket securement means 70. For purposes of disclosure, the bracket securement means 70 is depicted as a series of holes 80 located on each bracket 60 at the location where the bracket 60 rests against the tool box 20. Bolts 90 or the like are used to secure each bracket 60 to the tool box 20.

Referring now to FIGS. 2, 5, 6 and 7, located on the end of each bracket 60, opposite the bracket securement means 70, is a roller 100. The roller 100 is in releasable contact with a track 110 located on a rail 120. The rail 120 is attached to an interior side wall of the truck 30 bed 40. The roller 100 is designed to roll along the track 110. It is further envisioned that the rollers 100 are capable of being locked, thereby keeping the rollers 100 from rolling along their respective tracks 110. which rotate in order to frictionally impinge within the internal conduit of the tracks 110.

Figure 4:
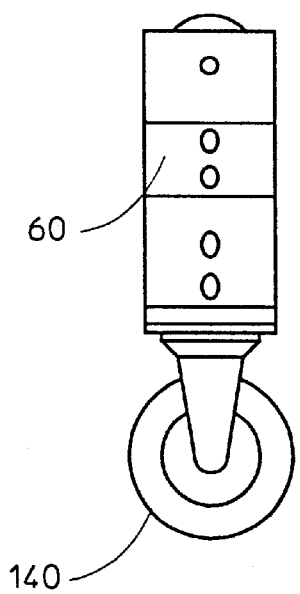
FIG. 4 is a front view of a bracket.
Figure 5:
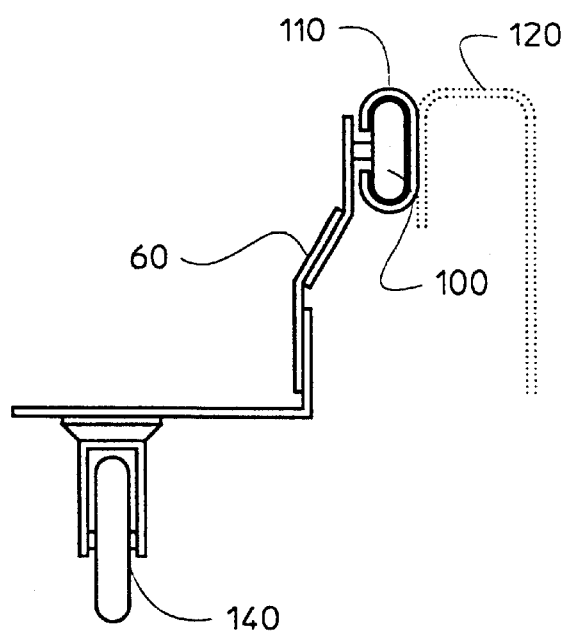
FIG. 5 is a side view of a roller and a track.
Figure 6:
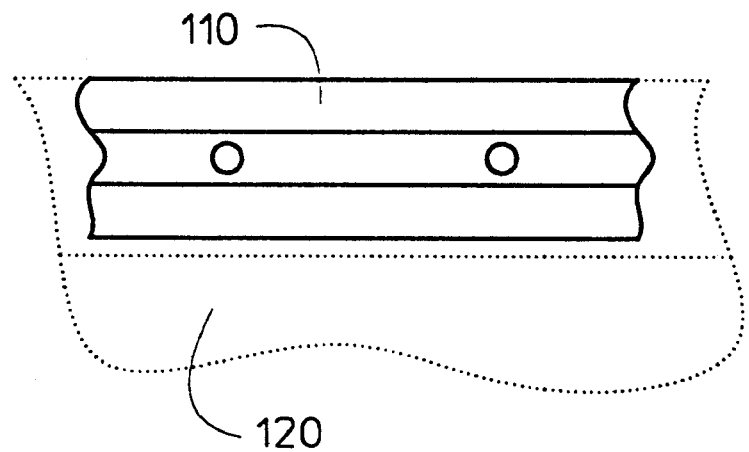
FIG. 6 is a front view of a rail.
Figure 7:
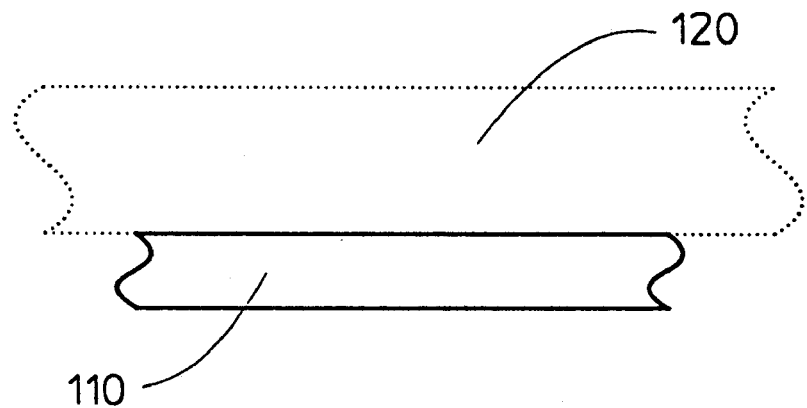
FIG. 7 is a top view of a rail.

Referring now to FIGS. 1 and 4, it is envisioned that a wheel 140 is attached to the bottom of each bracket 60, near the end of the bracket 60 that is opposite the roller 100. The wheel 140 is positioned to act as a wheel for the tool box 20. The wheels 140 are designed to permit the tool box 20 to roll along on any flat, hard surface.

Referring now to FIG. 2, it is envisioned that the brackets 60 may be of a multi piece, adjustable construction so as to allow the user to adjust the height of the rollers 100 relative to the tool box 20 and to adjust the horizontal distance the roller 100 is located relative to the tool box 20. This feature allows the brackets 60 to be used on a plurality of truck 30 beds 40 and with a plurality of tool boxes 20. It is envisioned that the brackets 60 are constructed of metal.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

To use the present invention, a user secures the brackets 60 to the tool box 20 via the bracket securement means 70. The rails 120 are mounted to the inside walls of the truck 30 bed 40. The brackets 60 are adjusted so that the rollers 100 rest in their respective tracks 110. The tool box 20 can then be rolled along the truck 30 bed 40. To remove the tool box 20 from the truck 30, simply lift the rollers 100 from the tracks 110 and remove the tool box 20. The tool box 20 can now be rolled on any hard surface The foregoing description is included to illustrate the operation of the preferred embodiment and is not meant to limit the scope of the invention. The scope of the invention is to be limited only by the following claims.

What is claimed is:

1. An add-on tool box transport kit for use with a truck bed comprising:

a plurality of roller assemblies, said roller assemblies designed to be releasably secured to a conventional tool box via bracket securement means; and a set of rails, said rails adapted to be mounted to the interior side walls of a truck, said rails containing a track;

wherein each of said bracket assemblies comprising:

a bracket, said bracket being of a generally L-shaped configuration, said bracket designed to be releasably secured to the bottom and side surface of said tool box by said bracket securement means, said bracket extending outward and upward from the end of said toolbox;

a roller, said roller located on the end of each bracket, opposite said bracket securement means, said roller being in releasable contact with said track in said rail; and a wheel, said wheel attached to the bottom of each bracket, near the end of said bracket that is opposite said roller, said wheel positioned to act as a wheel for said tool box.

2. The add-on tool box transport kit for use with a truck bed described in claim 1, wherein said brackets are of a multi piece, adjustable construction so as to allow the user to adjust the height of said rollers relative to said tool box and to adjust the horizontal distance said roller is located relative to said tool box.

3. The add-on tool box transport kit for use with a truck bed described in claim 1, wherein said bracket securement means further comprises:

a series of holes, said holes located on each bracket at a location where said bracket is configured to rest against said tool box; and bolts, said bolts used to secure each bracket to said tool box via said series of holes.

\* \* \* \* \*